May 15, 1962     S. A. CORREN     3,035,110

INTEGRAL ELECTRODE-SEPARATOR STRUCTURE

Filed Nov. 18, 1959

INVENTOR.
SIDNEY A. CORREN

BY

Leonard H. King

United States Patent Office 3,035,110
Patented May 15, 1962

3,035,110
INTEGRAL ELECTRODE-SEPARATOR STRUCTURE
Sidney A. Corren, 163 Cherry St., Katonah, N.Y.
Filed Nov. 18, 1959, Ser. No. 853,956
13 Claims. (Cl. 136—145)

This invention relates to an improvement in the art of liquid permeable battery separators, for alkaline cells.

In the copending application of Myron A. Coler and Arnold S. Louis, entitled "Monolithic Electrode-Separator Structure for Electrochemical Cells," filed concurrently herewith and assigned Serial No. 853,826, there is claimed a porous separator and electrode particle retention means for battery electrodes formed in situ on the electrode. The separator is formed by coating the electrode with a composition containing a suitable water-insoluble resin and a water-swellable polymer.

The solvent employed is water soluble and chemically nonreactive with the polymer. After solution of the resin is complete, there is dispersed therein the water-swellable polymeric material which is not soluble in the water-soluble solvent. The electrode is then coated with the composition containing the dispersed water-swellable material. The coated electrode is then immersed in water so as to dissolve out the water-soluble solvent and thereby fix a porous resin coating over the electrode.

This invention is an improvement over the electrode separator disclosed in the referenced copending application as it provides an electrode structure, including an integral separator, which may be tightly coiled or repeatedly flexed without cracking of the porous coating, particularly along the edges. Briefly stated, the improvement is obtained by wrapping the electrode with a fibrous reinforcing structure which is then impregnated together with the electrode with the composition described earlier to form a reinforced porous composition.

One application of the invention is in the production of rolled battery electrodes wherein the electrodes are formed in long strips and then rolled to form a compact high current density battery structure.

The invention will be readily understood by referring to the accompanying drawing taken into conjunction with the following description:

Figure 1:
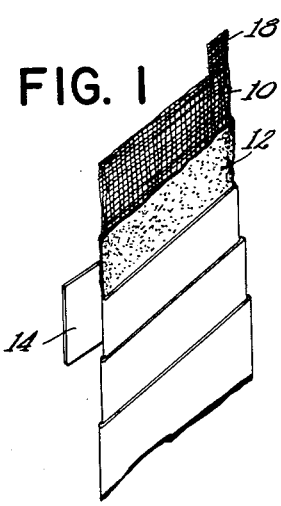
FIGURE 1 shows in perspective a typical electrode partially wrapped with a synthetic resin cloth.
Figure 2:
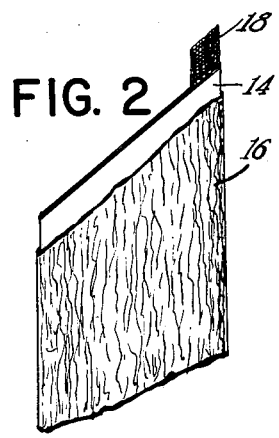
FIGURE 2 shows in perspective a typical battery electrode assembly showing the wrapped electrode of FIGURE 1 impregnated with a porous resin composition.
Figure 3:
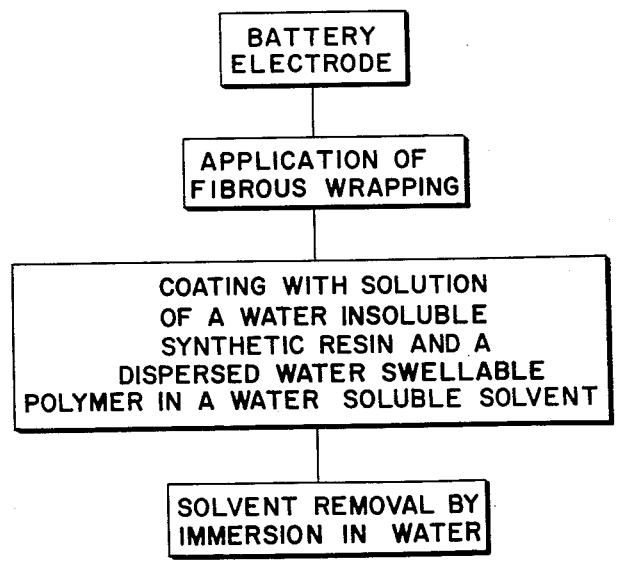
FIGURE 3 is a flow sheet of a process for making the covered electrode of FIGURE 2.

In FIGURE 1, there is shown a wire mesh 10, selected of a metal non-reactive with the components of the particular electrochemical system employed. Upon the mesh there is coated a composition 12, comprising an active electrode material and a synthetic resin binder. The electrode is spirally wrapped with overlapping layers of a synthetic resin fabric 14, which is chemically resistant to the electrolyte for the particular electrochemical system involved. The wrapped electrode is then impregnated with a porous resin coating 16 of the type described earlier. The resulting electrode is then assembled with an electrode of opposite polarity and placed in a suitable container containing an electrolyte solution. Connection is made to the electrode by metal tab 18, welded to mesh 10.

Example 1

A flexible battery electrode 0.027 inch thick was made by coating a nickel wire screen, formed of 0.007 inch diameter wire woven 40 x 60 wires per inch, with an electrode forming composition. The coating composition consisted of 3 parts nickel hydroxide and 2 parts of an electrically conductive resin composition. The resin composition comprised equal parts acetylene black and a copolymer containing 85 parts polyvinyl chloride and 15 parts polyacrylonitrile. Proportions recited in this application are to be understood to be in parts by weight.

The electrode was spirally wrapped with an overlapping layer of nylon cloth 0.004 inch thick and weighing 1.46 ounces per square yard. The electrode had a length of 20 inches. After wrapping with the overlapped layer of nylon cloth, the wrapped electrode was impregnated as follows:

A resin coating composition was prepared by dissolving 67 grams of a 80:20 polyvinyl chloride-polyacrylonitrile copolymer in 540 grams of dimethyl formamide by means of a high-speed propeller mixer. Then 200 grams of polyvinyl alcohol, having a molecular weight of about 1500 were dispersed therein and mixing continued for five minutes. The wrapped electrode was then immersed in the resulting composition.

The wet coated electrode was then dipped into water at room temperature (68° F.) in order to fix the coating by dissolving out the dimethyl formamide.

The coated electrode was then washed in running water for two hours to assure the removal of all traces of the dimethyl formamide.

A composition containing 69 parts cadmium powder, 31 parts of cadmium oxide, and 3 parts of an 85:15 polyvinyl chloride-polyacrylonitrile copolymer as a binder was applied to a similar nickel screen to form a negative electrode strip having an overall electrode thickness of 0.019". The negative electrode was positioned against the coated positive electrode, each of said strips being 20" long. The electrodes were then tightly spirally wound so as to fit within a 1.25" inside diameter polymethyl methacrylate tube. An electrolyte solution containing 25% by weight of potassium hydroxide was then introduced. The resulting cell was tested through 46 cycles of charge and discharge and was found to yield highly satisfactory performance.

A similar electrode assembly prepared without nylon fabric but employing a coating of polyvinyl chloride-polyacrylonitrile as a separator was found to be unsatisfactory for this application in that the tight rolling of the electrodes caused cracking, particularly at the center portion of small diameter.

Following the procedure of Example 1 a number of different combinations were tested as indicated below:

Example 2

| Coating composition: | Grams |
|---|---|
| Polyvinyl chloride—polyacrylonitrile (80:20) copolymer | 67 |
| Isophorone | 540 |
| Polyvinyl alcohol | 200 |

Wrapping material:
  Polyvinylidene chloride—polyvinyl chloride (85:15) copolymer woven fiber cloth (0.010" thick)

Example 3

| Coating composition: | Grams |
|---|---|
| Polyvinyl chloride | 100 |
| Dimethyl formamide | 600 |
| Starch | 400 |

Wrapping material:
  Woven glass fiber cloth (0.010" thick)

Example 4

| Coating composition: | Grams |
|---|---|
| Polyvinyl butyral | 100 |
| Methyl alcohol | 300 |
| Carboxy ethyl cellulose | 300 |

Wrapping material:
   Polyacrylonitrile—woven fiber cloth (0.008" thick)

Example 5

Coating composition:

| | Grams |
|---|---|
| Cellulose acetate | 80 |
| Acetone | 600 |
| Zein | 250 |

Wrapping material:
   Polyvinyl chloride—vinyl acetate woven fiber cloth (0.006" thick)

Example 6

The procedure of Example 1 was repeated using the same coating composition and electrodes but employing a 0.001" thick felted mat of unwoven 0.0001" thick Dynel fiber. The resulting electrodes were found to be easy to handle and to provide excellent performance when tested in a cell.

The various combinations of Examples 2–6 were found to perform satisfactorily.

The most suitable materials presently known for the porous resin film are polyvinyl chlorides and polyvinyl chloride compositions containing other polymers and, in particular, copolymers containing from 20% to 50% polyvinyl chloride and the balance polyacrylonitrile.

Other resins useful for this purpose are polyvinyl acetate, polyvinyl butyral, cellulose acetate, polyvinylidene chloride, and compositions containing both polyvinyl chloride and polyvinyl acetate.

Suitable swellable materials include starch, gelatin, cold water insoluble polyvinyl alcohol, zein, carboxy methyl cellulose, carboxy ethyl cellulose, and collagens such as bone glues.

The water-swellable material should be present in a range of from at least ½ part to 6 parts per each part of water-insoluble resin.

It is desirable to employ a maximum amount of water swellable material consistent with maintaining adequate mechanical film strength.

The quantity of solvent present in the resin solution, containing the dispersed water-swellable material, applied to the electrode is not critical in the low end of the range and is limited only to the quantity required to produce a fluid composition having a viscosity suitable for coating. At the high end of the range, the quantity limitation is critical and the applied composition may not contain more than 95% solvent by weight.

Suitable woven or matted fibrous wrapping materials include: cellulose acetate, glass fiber, polyethylene, polytetrafluoroethylene, polyesters such as Dracon, acrylics such as Orlon and acrylan, polyacrylonitrile, cellulose products and copolymers of polyvinyl chloride and acrylonitrile such as Dynel. The above listing is provided by way of example and is not to be construed as limiting.

The fibers should not be subject to excessive swelling in the electrolyte and should not be soluble in it.

Fibers resistant to the action of particular electrolytes may be readily determined by reference to the published literature. For example, reference may be made to pages 856–861 of the "1955 Modern Plastics Encyclopedia Issue" where there is reported the chemical resistance properties of various synthetic resin fibers.

The weave and thickness of the wrapping has been found to be non-critical.

The resin, the water-soluble solvent for the resin, and the water-swellable polymer should be mutually non-reactive and chemically resistant to the electrolyte.

It is to be understood that having read the foregoing disclosure one may readily select combinations of materials other than specifically disclosed and carry out the invention without departing from the spirit thereof.

Having thus disclosed the invention,
What is claimed is:

1. The process of encasing a battery electrode with a sheath porous to alkaline liquid electrolyte normally employed in combination with said electrode, comprising the steps of covering said electrode with a porous layer formed of synthetic resin fibers, impregnating said covered electrode with a composition comprising a solution of a water-insoluble resin in a water-soluble solvent, having dispersed therein a water-swellable polymer not soluble in said solvent, and dissolving out, with water, said water-soluble solvent, said synthetic resin fibers, said water-insoluble resin, and said water-swellable polymer being mutually non-reactive and chemically resistant to said electrolyte.

2. The process of encasing a battery electrode with a sheath porous to alkaline liquid electrolyte normally employed with said electrode, comprising the steps of covering said electrode with a porous layer formed of synthetic resin fibers, making a composition comprising a solution of a water-insoluble resin in a water-soluble solvent, dispersing therein a water-swellable polymer not soluble in said water-soluble solvent, impregnating said covering with said composition, and in turn, immersing said covered electrode in water to dissolve out said water-soluble solvent, wherein said water-swellable polymer is selected from the group consisting of: polyvinyl alcohol, zein, gelatin, starch, carboxy methyl cellulose, carboxy ethyl cellulose, and collagens, said synthetic fibers, said water-insoluble resin and said water-swellable polymer being mutually non-reactive and chemically resistant to said electrolyte.

3. The process of encasing a flexible battery electrode with a flexible covering porous to an alkaline liquid electrolyte normally employed with said electrode, comprising the steps of making a composition of a water-insoluble resin selected from the group consisting of: polyvinyl chloride, polyvinyl chloride-polyacrylonitrile compositions, polyvinyl butyral, cellulose acetate, polyvinylidene chloride, and polyvinyl chloride-polyvinyl acetate compositions, in a water-soluble solvent, dispersing therein a water-swellable polymer not soluble in said water-soluble solvent, covering said electrode with a porous layer formed of synthetic resin fibers, impregnating said covered electrode with said composition, removing said impregnated covering from said composition, and in turn immersing said impregnated covering in water so as to dissolve out said water-soluble solvent, wherein said water-swellable polymer is selected from the group consisting of: polyvinyl alcohol, zein, gelatin, starch, carboxy methyl cellulose, carboxy ethyl cellulose, and collagens, said synthetic resin, said water-insoluble resin, and said water-swellable polymer being mutually non-reactive and chemically resistant to said electrolyte.

4. The process of encasing a flexible battery electrode with a flexible sheath porous to an alkaline liquid electrolyte normally employed with said electrode, comprising the steps of making a composition comprising a solution of polyvinyl chloride in a water-soluble solvent, dispersing therein a water-swellable polymer not soluble in said water-soluble solvent, said water-swellable polymer being selected from the group consisting of: polyvinyl alcohol, zein, gelatin, starch, carboxy methyl cellulose, carboxy ethyl cellulose, and collagens, covering said electrode with a porous layer formed of synthetic resin fibers, impregnating said covered electrode with said composition, and immersing said impregnated electrode covering in water so as to dissolve out said water-soluble solvent, said polyvinyl chloride, said water-insoluble resin, and said water-swellable polymer being mutually non-reactive and chemically resistant to said electrolye.

5. The process of encasing a flexible battery electrode with a sheath porous to an alkaline liquid electrolyte normally employed with said electrode, comprising the steps of making a composition comprising a solution of polyvinyl butyral, in a water-soluble solvent, dispersing therein a water-swellable polymer not soluble in said water-soluble solvent, covering said electrode with a porous layer formed of synthetic resin fibers, impregnating said covered electrodes with said solution, and immersing said electrode in water so as to dissolve out said water-soluble solvent, wherein said water-swellable polymer is selected from the group consisting of: polyvinyl alcohol, zein, gelatin, starch, carboxy methyl cellulose, carboxy ethyl cellulose, and collagens, said polyvinyl butyral, said water-insoluble resin, and water-swellable polymer being mutually non-reactive and chemically resistant to said electrolyte.

6. The process of encasing a flexible battery electrode with a flexible sheath porous to an alkaline liquid electrolyte normally employed with said electrode, comprising the steps of covering said electrode with a porous layer formed of synthetic resin fibers, said fibers being chemically inert to said alkaline electrolyte, making a composition comprising a solution of a copolymer of polyvinyl chloride and polyacrylonitrile in a water-soluble solvent having dispersed therein from 0.5 to 6 parts by weight of polyvinyl alcohol per part by weight of said copolymer, immersing said covered electrode in said composition, removing said covered electrode from said composition and immersing said covered electrode in water so as to dissolve out said water-soluble solvent.

7. The process of claim 6 wherein said copolymer contains from 20 to 50 parts by weight of polyacrylonitrile per 100 parts of copolymer.

8. The process of claim 6 wherein said water-soluble solvent is dimethyl formamide.

9. The process of claim 5 wherein said water-soluble solvent is isophorone.

10. A flexible battery electrode encased in a continuous flexible sheath porous to an alkaline liquid electrolyte normally employed with said electrode, said sheath being composed of a synthetic resin woven fiber wrapping impregnated with a porous coating of a water-insoluble resin selected from the group consisting of: polyvinyl chloride, polyvinyl chloride-polyacrylonitrile compositions, polyvinyl butyral, cellulose acetate, polyvinylidene chloride, and polyvinyl chloride-polyvinyl acetate compositions, and distributed through said resin about 0.5 to 6 parts by weight, per part by weight of said water-insoluble polymer, of a water-swellable polymer selected from the group consisting of: polyvinyl alcohol, zein, gelatin, starch, carboxy methyl cellulose, carboxy ethyl cellulose, and collagens, said synthetic resin, said water-insoluble resin, and said water-swellable polymer being mutually non-reactive and chemically resistant to said electrolyte.

11. A flexible battery electrode encased in a flexible sheath porous to an alkaline liquid electrolyte normally employed with said electrode, said sheath being composed of a synthetic resin porous cloth covering impregnated with a water-insoluble resin consisting of at least 50% polyvinyl chloride and the balance polyacrylonitrile, and distributed through said resin from 0.5 to 6 parts by weight of a water-swellable polymer, per part by weight of said water-insoluble resin, selected from the group consisting of: polyvinyl alcohol, zein, gelatin, starch, carboxy methyl cellulose, carboxy ethyl cellulose, and collagens, said water-insoluble resin and said water-swellable polymer being mutually non-reactive and chemically resistant to said electrolyte.

12. A flexible battery electrode covered with a flexible sheath porous to an alkaline liquid electrolyte normally used with said electrode, said sheath comprising a woven synthetic resin cloth encasing said electrode, said cloth being impregnated with a coating composed of about 1 part by weight of polyvinyl chloride and distributed in said polyvinyl chloride from about 0.5 to 6 parts by weight of a water-swellable polymer selected from the group consisting of: polyvinyl alcohol, zein, gelatin, starch, carboxy methyl cellulose, carboxy ethyl cellulose, and collagens, said polyvinyl chloride, said synthetic resin cloth, and said water-swellable polymer being mutually non-reactive and chemically resistant to said electrolyte.

13. A flexible battery electrode covered with woven nylon impregnated with a porous composition forming a sheath porous to an alkaline liquid electrolyte normally used with said electrode, said composition being composed of about 1 part by weight, of a resin consisting of at least 50% polyvinyl chloride and the balance polyacrylonitrile, and distributed through said resin from about 0.5 to 6 parts by weight of polyvinyl alcohol.

References Cited in the file of this patent

UNITED STATES PATENTS

| | | |
|---|---|---|
| 1,981,352 | Fruth | Nov. 20, 1934 |
| 2,570,677 | Honey et al. | Oct. 9, 1951 |
| 2,824,023 | Banigan | Feb. 18, 1958 |
| 2,838,482 | Mendelsohn | June 10, 1958 |
| 2,862,988 | Dillehay et al. | Dec. 2, 1958 |
| 2,940,871 | Smith-Johannsen | June 14, 1960 |
| 2,945,080 | Chapman et al. | July 12, 1960 |

FOREIGN PATENTS

| | | |
|---|---|---|
| 371,478 | Great Britain | Apr. 28, 1932 |